(12) United States Patent
Shim et al.

(10) Patent No.: US 8,588,858 B2
(45) Date of Patent: Nov. 19, 2013

(54) PORTABLE TERMINAL WITH DUAL HINGE AXES

(75) Inventors: Seon-Hee Shim, Gyeonggi-do (KR);
Sang-Joon Park, Seoul (KR);
Jong-Woo Kim, Gyeonggi-do (KR);
Seok-Gyu Lee, Gyeonggi-do (KR)

(73) Assignee: Samsung Electronics Co., Ltd.,
Suwon-si, Gyeonggi-do (KR)

( * ) Notice: Subject to any disclaimer, the term of this patent is extended or adjusted under 35 U.S.C. 154(b) by 277 days.

(21) Appl. No.: 12/862,971

(22) Filed: Aug. 25, 2010

(65) Prior Publication Data

US 2011/0053664 A1 Mar. 3, 2011

(30) Foreign Application Priority Data

Aug. 27, 2009 (KR) ........................ 10-2009-0079918

(51) Int. Cl.
*H04M 1/00* (2006.01)
*H04B 1/38* (2006.01)
*H04M 1/725* (2006.01)

(52) U.S. Cl.
CPC ...... *H04M 1/72519* (2013.01); *H04M 1/72583* (2013.01); *H04M 1/72522* (2013.01)
USPC ..................... 455/566; 455/575.1; 455/575.3; 348/267; 348/372; 361/679.23; 396/29; 396/536; 439/595

(58) Field of Classification Search
USPC ............... 455/575.1–575.4, 566; 361/679.23, 361/683; 348/372, 267; 396/29, 267, 536; 439/595
See application file for complete search history.

(56) References Cited

U.S. PATENT DOCUMENTS

| | | | | |
|---|---|---|---|---|
| 3,686,619 A * | 8/1972 | McCardell et al. | ........... | 439/595 |
| 6,067,116 A * | 5/2000 | Yamano et al. | ............... | 348/372 |
| 6,115,556 A * | 9/2000 | Reddington | ................... | 396/267 |
| 6,118,653 A * | 9/2000 | Kim | ......................... | 361/679.23 |
| 6,246,840 B1 * | 6/2001 | Tani | ............................. | 396/536 |
| 6,292,980 B1 | 9/2001 | Yi et al. | | |
| 6,304,724 B1 * | 10/2001 | Ando | ............................. | 396/29 |
| 7,171,247 B2 | 1/2007 | Han | | |
| 7,215,981 B2 | 5/2007 | Yang | | |
| 7,440,783 B2 | 10/2008 | Hyun | | |
| 7,499,540 B2 | 3/2009 | Oliver | | |
| 7,526,082 B2 | 4/2009 | Abe et al. | | |
| 2002/0137551 A1 * | 9/2002 | Toba | ............................. | 455/566 |
| 2003/0053287 A1 * | 3/2003 | Baldwin et al. | ............... | 361/683 |
| 2004/0127266 A1 | 7/2004 | Aagaard et al. | | |
| 2004/0137970 A1 | 7/2004 | Han | | |
| 2004/0209645 A1 | 10/2004 | Park et al. | | |
| 2005/0215296 A1 * | 9/2005 | Fujihara et al. | ............. | 455/575.3 |
| 2007/0123319 A1 * | 5/2007 | Hwang | ....................... | 455/575.1 |

FOREIGN PATENT DOCUMENTS

WO WO 2004/054210 6/2004

* cited by examiner

*Primary Examiner* — William D Cumming
(74) *Attorney, Agent, or Firm* — Cha & Reiter, LLC

(57) ABSTRACT

A portable terminal with a pair of housings is provided, in which a guide rib is formed in a first housing for providing a reception groove, a first hinge member is engaged with the first housing for rotating upon a first hinge axis extended along a length direction of the first housing, a second hinge member is formed in a second housing and includes a hinge housing extended along a width direction of the second housing, and an additional device is accommodated in the hinge housing.

17 Claims, 6 Drawing Sheets

PORTABLE TERMINAL WITH DUAL HINGE AXES

CLAIM OF PRIORITY

This application claims the benefit under 35 U.S.C. §119(a) of a Korean Patent Application filed in the Korean Intellectual Property Office on Aug. 27, 2009 and assigned Serial No. 10-2009-0079918, the entire disclosure of which is hereby incorporated by reference.

BACKGROUND OF THE INVENTION

1. Field of the Invention

The present invention generally relates to a portable terminal in which a pair of housings is foldably coupled to each other. More particularly, the present invention relates to a portable terminal where one housing can be rotatably opened in two directions with respect to the other housing.

2. Description of the Related Art

In general, portable terminals are categorized into a bar type, a flip type, and a folder type. A bar-type terminal has data input and output devices, a transmitter, and a receiver within a single body housing. As a keypad being a data input device is kept open, an unintended or wrong operation can result. Also, there are limitations in miniaturizing the bar-type terminal due to a distance between the transmitter and the receiver.

A flip-type terminal includes a body, a flip, and a hinge module that connects the body to the flip. Data input and output devices, a transmitter, and a receiver are installed in the body. The flip covers a keypad as a data input device, thereby preventing an unintended or wrong operation of the terminal. However, the flip-type terminal also faces limitations in miniaturization because of the distance requirement between the transmitter and the receiver.

The folder-type terminal includes a body, a folder, and a hinge module that rotatably connects the body to the folder. The folder is opened or closed by rotation. Wrong operations of a keypad can be prevented in idle mode where the folder is in close contact with the body. During a call mode, the folder is open allowing a transmitter and a receiver to be sufficiently apart from each other. Thus, the folder-type terminal can be made small. This is why folder-type terminals have been predominantly popular. Owing to diverse tastes of users, sliding-type and swing-type portable terminals have emerged. Currently, the sliding type is more popular than the folder type.

Meanwhile, along with the development of mobile communication services beyond voice call or message transmission, portable terminals are now considered a necessity and various services are available through the portable terminals. For example, a user can download a game or enjoy an on-line game through a portable terminal. Also, Digital Multimedia Broadcasting (DMB) programs, videos, and music files can be downloaded and replayed in portable terminals. Financial services are also gaining popularity, such as a Subscriber Identification Module (SIM)-based credit card function.

The outward designs of portable terminals have been developed, mainly addressing communication functions including voice call and message transmission. However, these terminals may not be suitable for multimedia service. For instance, the display of a typical portable terminal is elongated vertically, thus it is inconvenience to view a DMB program, a video, etc. in a limited display.

SUMMARY OF THE INVENTION

An aspect of exemplary embodiments of the present invention is to address at least the problems and/or disadvantages and to provide at least the advantages described below. Accordingly, an aspect of exemplary embodiments of the present invention is to provide a portable terminal having two hinge axes for two optional viewings to enable a user to conveniently enjoy a multimedia service such as viewing of a broadcast program, as well as a communication function.

Another aspect of exemplary embodiments of the present invention provides a portable terminal for allowing a housing to be opened or closed in two directions by providing first and second hinge axes, so that a user may open or close the portable terminal in an intended direction, thus enhancing user's experience and convenience.

In accordance with an aspect of exemplary embodiments of the present invention, a portable terminal with a pair of housings, in which a guide rib is formed in a first housing for providing a reception groove, a first hinge member is engaged with the first housing for rotating upon a first hinge axis extended along a length direction of the first housing, a second hinge member having a hinge housing formed in a second housing, the hinge housing is extended along a width direction of the second housing, and an additional device is accommodated in the hinge housing. When the second housing covers the first housing, the hinge housing is positioned in the reception groove, covered by the guide rib. With one end of the hinge housing engaged with the first hinge member, face to face, the hinge housing rotates upon a second hinge axis extended along the width direction of the second housing. The second housing is opened to one side of the first housing from a position in which the second housing is folded on the first housing via a rotation of the first hinge member upon the first hinge axis, and the second housing is opened upward from the first housing from the position in which the second housing is folded on the first housing via a rotation of the second hinge member upon the second hinge axis.

When the second housing is opened upward from the first housing, an outer surface of the second housing may interfere with the guide rib and limit an opening angle of the second housing.

The portable terminal may further include a keypad provided at the first housing for being opened and closed by the second housing, and a display provided at the second housing. When the first and second housings are folded to each other, the display may face the keypad.

The shape of hinge housing may be cylindrical, and the additional device accommodated in the hinge housing may be at least one of a speaker phone, a camera module, and an antenna device.

The hinge housing may be formed at one end of the second housing and a speaker phone may be installed within the hinge housing. Another speaker phone may be also provided inside the other end of the second housing. Further, another camera module may be provided near the other speaker phone inside the other end of the second housing.

The portable terminal may further include a fixing shaft extended along a direction of the first hinge axis, fixed in the first housing, and protruding at a side of the guide rib. The first hinge member may be engaged with the fixing shaft and rotate upon the first hinge axis.

The first hinge member may include a first rotation member engaged with the fixed shaft for rotating upon the first hinge axis and a cover member for covering the rotation member.

The second hinge member may include a rotation shaft extended along the direction of the second hinge axis and engaged with the first rotation member for rotating upon the second hinge axis, and a second rotation member fixed in the hinge housing. The second rotation member may be extended along the direction of the second hinge axis and fixed to the rotation shaft for rotating along with the rotation shaft upon the second hinge axis.

BRIEF DESCRIPTION OF THE DRAWINGS

The above features and advantages of certain exemplary embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF THE INVENTION

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
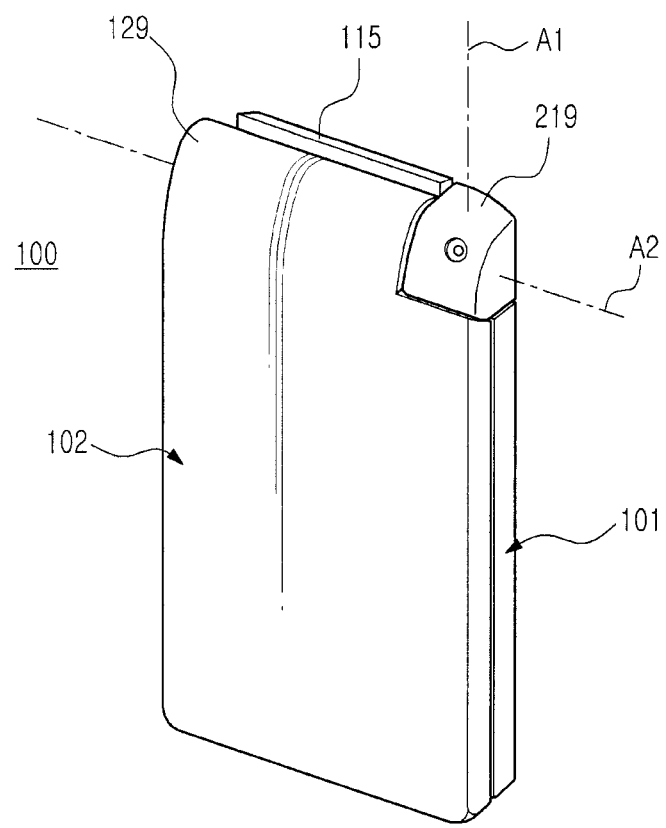
FIG. 1 is a perspective view of a portable terminal according to an exemplary embodiment of the present invention.
Figure 2:
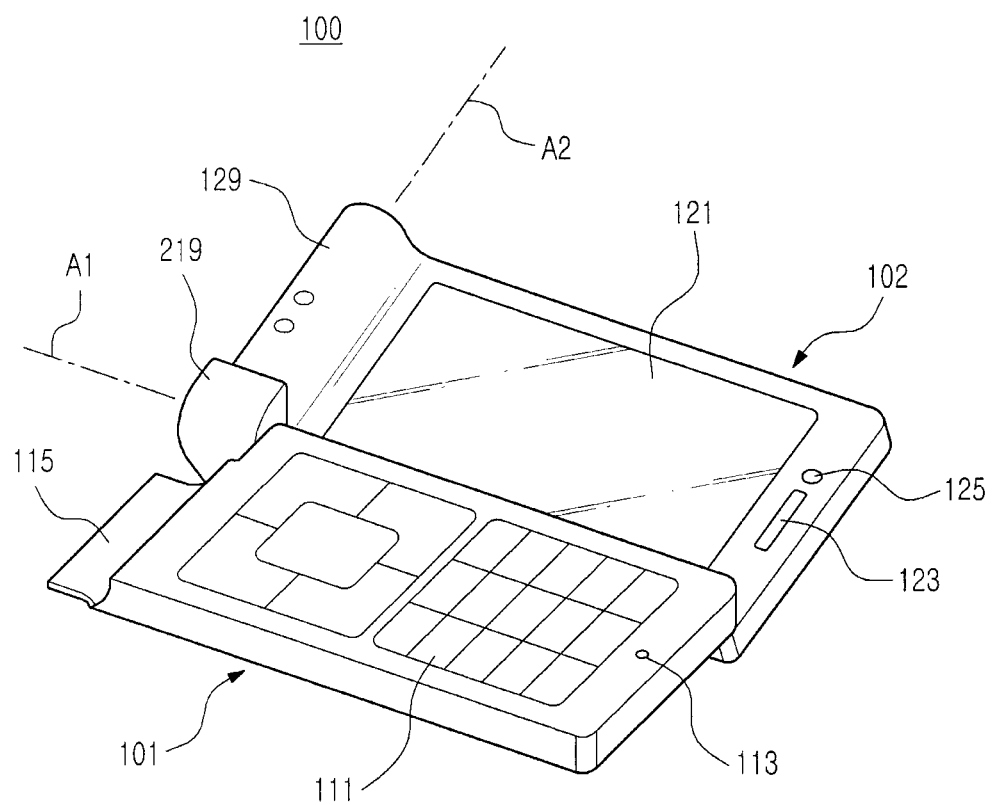
FIG. 2 is a perspective view of the portable terminal illustrated in FIG. 1 in a state where a second housing is opened to a side of a first housing.
Figure 3:
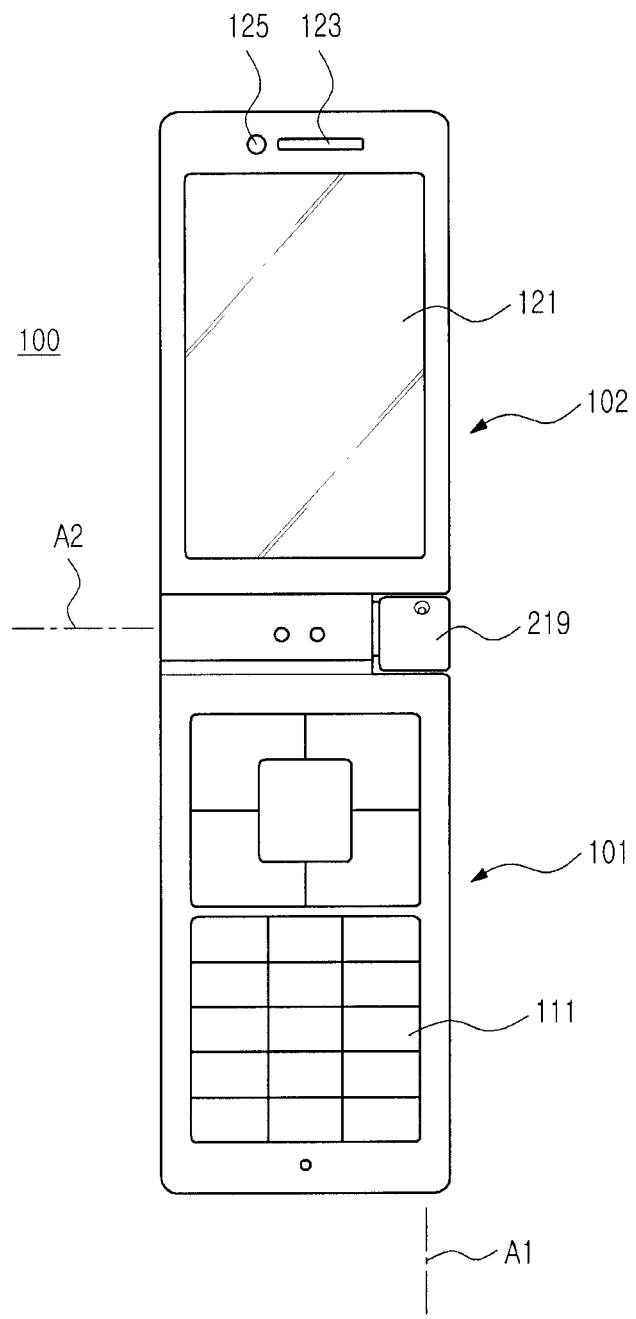
FIG. 3 is a plan view of the portable terminal illustrated in FIG. 1 in a state where the second housing is opened upward from the first housing.

FIG. 1 is a perspective view of a portable terminal 100 according to an exemplary embodiment of the present invention, FIG. 2 is a perspective view of the portable terminal 100 illustrated in FIG. 1 in which a second housing 102 is opened by rotating about a first hinge axis A1, and FIG. 3 is a plan view of the portable terminal 100 illustrated in FIG. 1 in which the second housing 102 is opened by rotating about a second hinge axis A2.

Referring to FIGS. 1, 2 and 3, a first housing 101 and the second housing 102 are coupled foldably to each other in the portable terminal 100 according to an exemplary embodiment of the present invention. The second housing 102 is opened to a side of the first housing 101 by rotating about the first axis A1 from a position where the second housing 102 is folded on the first housing 101, or the second housing 102 is opened upward from the first housing 101 by rotating about the second axis A2 from the folded position. The first hinge axis A1 is extended along the length of the first housing 101 in the vicinity of an edge of the first housing 101. The second hinge axis A2 is extended along the width of the second housing 102 in the vicinity of an end of the second housing 102. Therefore, the second hinge axis A2 is perpendicular to the first hinge axis A1.

A keypad 111 and a transmitter 113 as input devices are installed in the first housing 101. The keypad 111 may be configured in the same structure as the keypad of a typical cellular phone with function keys and number keys, or the keypad 111 may include keys arranged in a qwerty layout.

A guide rib 115 is formed at an upper end of the first housing 101. The guide rib 115 is thinner than the first housing 101, thus resulting in a reception groove on the guide rib 115 at the upper end of the first housing 101. While shown in FIG. 2, the reception groove is denoted by no reference numeral. When the first and second housings 101 and 102 are folded to each other, a hinge housing 129 is accommodated in the reception groove, as illustrated in FIG. 1.

Meanwhile, when the second housing 102 is about to be opened upward from the first housing 101, the hinge housing 129 is still covered by the guide rib 115. However, when the second housing 102 is fully opened, the guide rib 115 is interfered by an outer surface of the second housing 102, as illustrated in FIG. 3, and as a result, the second housing 102 can be opened to a limited angle upward from the first housing 101. Considering the opening of the second housing 102 upward from the first housing 101 is for a voice call on the whole, the opened angle of the second housing 102 is appropriate to be 155° to 165°.

The second housing 102 is provided with output devices such as a display 121 and a receiver 123. When the second housing 102 is folded on the first housing 101, the display 121 faces the keypad 111. As illustrated in FIG. 2, when the second housing 102 is opened sideways from the first housing 101, a user may conveniently enjoy a multimedia function such as video viewing by positioning the display 121 to be elongated horizontally. If the keypad 111 is a qwerty keypad, the user may write and send an-email on the keypad 111 with convenience. As illustrated in FIG. 3, when the second housing 102 is opened upward from the first housing 101, the user may enjoy a mobile communication function or a game through the portable terminal 100 as he or she would with a typical folder-type terminal.

Figure 4:
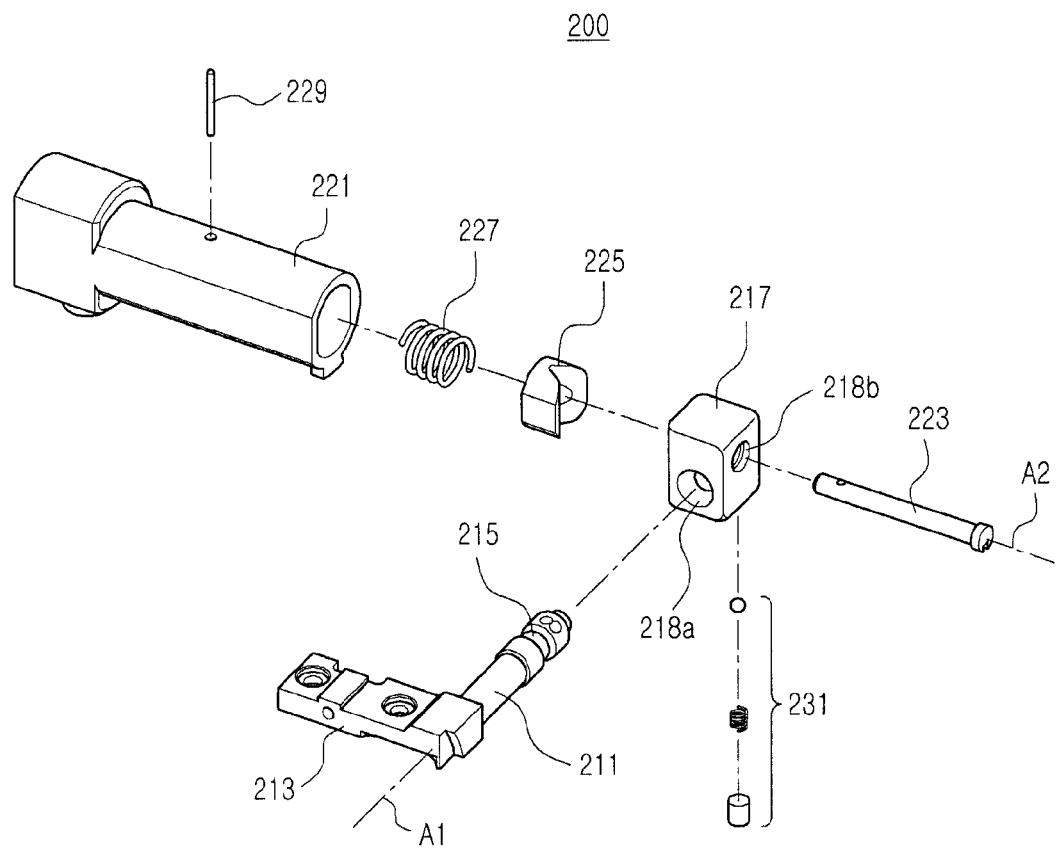
FIG. 4 is an exploded perspective view of a hinge device for engaging the first and second housings with each other in the portable terminal illustrated in FIG. 1.
Figure 5:
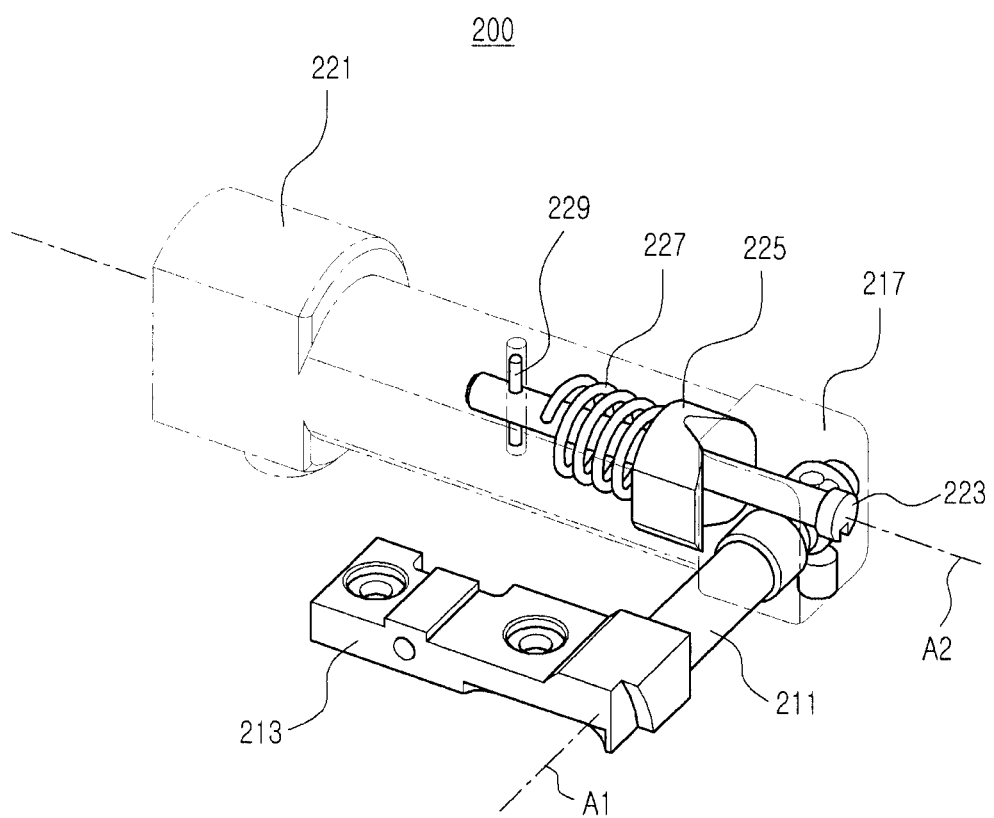
FIG. 5 is an assembled perspective view of the hinge device illustrated in FIG. 4.
Figure 6:
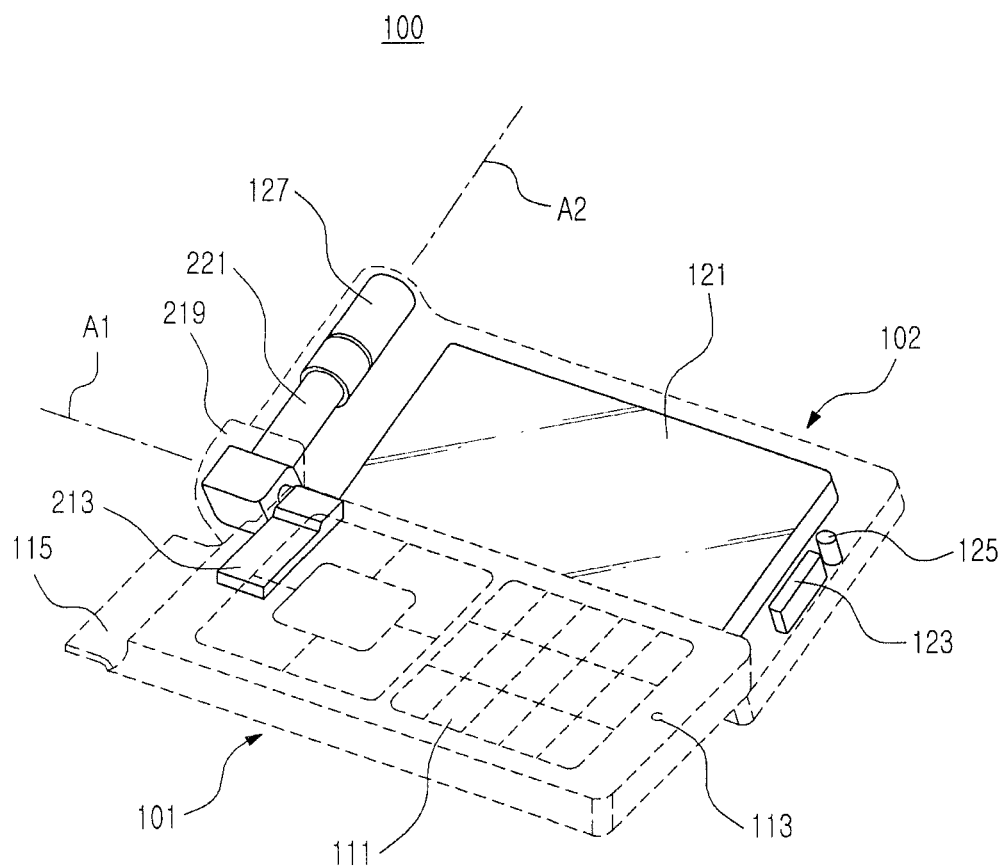
FIG. 6 is a perspective view illustrating the interior of the portable terminal illustrated in FIG. 2.

With reference to FIGS. 4, 5 and 6, a description will be made of the configuration of the hinge device 200 for rotatably coupling the first and second housings 101 and 102 to each other.

The hinge device 200 includes a first hinge member engaged with the first housing 101 for rotating about the first hinge axis A1, and a second hinge member engaged with the first hinge member for rotating about the second hinge axis A2. Since the second hinge member is engaged with the first hinge member, when the first hinge member rotates about the first hinge axis A, the second hinge member circles around the first hinge axis A1.

The first hinge member includes a first rotation member 217 and a cover member 219. The first rotation member 217 is engaged with the first housing 101 and rotates about the first hinge axis A1. A first rotation hole 218a is formed extending through the first rotation member 217 along the direction of the first hinge axis A1, and a second rotation hole 218b is formed extending through the first rotation member 217 along the direction of the second hinge axis A2. Although the first and second rotation holes 218a and 218b are partially overlapped with each other, they do not fully engage each other. In other words, while the first and second hinge axes A1 and A2 are extended through the centers of the first and second rotation holes 218a and 218b, respectively, they are perpendicular to each other, apart from each other, and the sum of the radiuses of the first and second rotation holes 218a and 218b is larger than the distance between the first and second hinge axes A1 and A2.

To engage the first rotation member 217 with the first housing 101, the first housing 101 is provided with a fixing shaft 211. The fixing shaft 211 is extended along the direction of the first hinge axis A1, and an engagement piece 213 is formed at an end of the fixing shaft 211, extending in a direction perpendicular to the first hinge axis A1. The engagement piece 213 serves to tightly fix the fixing shaft 211 to the first housing 101.

The fixing shaft 211 is fixed to the first housing 101 by the engagement piece 213, with the other end portion of the fixing shaft 211 protruding at a side of an end portion of the first housing 101, specifically in the vicinity of an end portion of the guide rib 115. The other end portion of the fixing shaft 211 is inserted into the first rotation hole 218a of the first rotation member 217.

A guide groove 215 is formed on an outer circumferential surface of the other end portion of the fixing shaft 211 along a circumferential direction. When the first rotation member 217 is engaged with the fixing shaft 211 and a rotation shaft 223 of the second hinge member is engaged with the rotation member 217, a part of the rotation shaft 223 is positioned in the guide groove 215. Therefore, the first rotation member 217 may rotate about the first hinge axis A1, in engagement with the fixing shaft 211. Along with the rotation of the first rotation member 217 about the first hinge axis A1, the rotation shaft 223 circles around the first hinge axis A1, while the part of the rotation shaft 223 moves along the guide groove 215.

A stopper 231 may be installed in the first rotation member 217. The stopper 231 includes a ball, a spring, and a fixing member. As the first rotation member 217 rotates, the ball rubs the other end portion of the fixing shaft 211 in the first rotation member 217. If a groove is formed on the other end portion of the fixing shaft 211 along the rubbing trajectory of the ball, the ball may be fit into the groove, thus stopping the rotation of the first rotation member 217 at a predetermined angular position.

In addition, the first rotation member 217 is provided with a peak portion (not shown), which will be described later in detail.

The cover member 219 covers the first rotation member 217, thus constituting a part of the exterior of the portable terminal 100. That is, the cover member 219 forms a part of the exterior of the portable terminal 100, covering the components of the hinge device 200, particularly the first rotation member 217. Hence, the cover member 219 makes the portable terminal 100 look more appealing.

The second hinge member includes the rotation shaft 223 and a second rotation member 221. With the first rotation member 217 engaged with the other end portion of the fixing shaft 211, the rotation shaft 223 extending along the direction of the second hinge axis A2 is inserted into the second rotation hole 218b. At the same time, a head formed on one end of the rotation shaft 223 is supported by the inlet of the second rotation hole 218b. As described earlier, when the rotation shaft 223 is engaged with the first rotation member 217 which has been engaged with the fixing shaft 211, the part of the rotation shaft 223 is placed in the guide groove 215. Thus, the first rotation member 217 is rotatably engaged with the fixing shaft 211.

The second rotation member 221 is shaped into a cylinder extended along the direction of the second hinge axis A2. Surrounding the rotation shaft 223, the second rotation member 221 is installed with one end thereof in contact with a side surface of the first rotation member 217. A fixing pin 229 fixes the second rotation member 221 to the rotation shaft 223 by penetrating the second rotation member 223 from a side surface thereof and then penetrating the rotation shaft 223 inside the second rotation member 223.

The second hinge member includes the hinge housing 129. The hinge housing 129 is also cylindrical, having the second rotation member 221 fixed inside. Consequently, the hinge housing 129 also rotates along with the rotation shaft 223 and the second rotation member 221 about the second hinge axis A2. When the first rotation member 217 rotates about the first hinge axis A1, the hinge housing 129 circles around the first hinge axis A1.

Meanwhile, the second hinge member may be provided with an elastic member 227 and a cam member 225 inside the second rotation member 221. A valley portion is formed on a surface of the cam member 225, facing the peak portion of the first rotation member 217. The elastic member 227 provides an elastic force in a direction that brings the cam member 225 into a close contact with the peak portion. As a consequence, the cam member 225 tends to rotate in a direction where its valley portion engages with the peak portion. The cam member 225 is installed such that it can make only a linear movement, not rotatable within the second rotation member 221. That is, when the second rotation member 221 rotates about the second hinge axis A2, the cam member 225 also rotates about the second hinge axis A2. When the valley portion deviates from the peak portion, the elastic force of the elastic member 227 is converted to a driving force that rotates the cam member 225 in the direction that brings the valley portion into engagement with the peak portion. The driving force rotates the second rotation member 221 and then eventually the second housing 102. The same driving force is exerted to fold the second housing 102 on the first housing 101 or open the second housing 102 upward from the first housing 101.

FIG. 6 is a perspective view illustrating the interior of the portable terminal 100 illustrated in FIG. 2, in which the first and second housings 101 and 102 are engaged with each other by the hinge device 200.

Referring to FIG. 6, the engagement piece 213 of the fixing shaft 211 is fixed within the first housing 101, and the hinge housing 129 formed at the end of the second housing 102 is engaged with the fixing shaft 211 by the first and second rotation members 217 and 221.

Meanwhile, a speaker phone, a camera module, and an antenna device may be installed in the second housing 102. To be more specific, a module-type additional device denoted by reference numeral 127 is installed in a remaining inner space of the hinge housing 129 after the second rotation member 221 is accommodated in the hinge housing 129. This additional device 127 may be one of a speaker phone, a camera module, and an antenna device. In addition, a speaker phone forming the receiver 123 is formed at the other end portion of the second housing 102, and a camera module 125 is installed near the speaker phone. If the additional device 127 installed in the hinge housing 129 is a speaker phone, the speaker phone may realize stereo sound together with the speaker phone forming the receiver 123. If the additional device 127 is an antenna device, this antenna device may be utilized as a DMB or Global Positioning System (GPS) antenna that operates independently of an antenna device for mobile communication.

The inner space of the first and second housings 101 and 102 can be efficiently used by installing an additional device such as a speaker phone or a camera module, or an antenna device within the hinge housing 129. For example, stereo sound may be necessary to a multimedia service. Without the hinge housing 129, it is difficult to secure as much room for another component as for the speaker phone in the second housing 102. Especially, it is obvious that there is a strict constraint on increasing the size of the display 121 that occupies most of the inner space of the second housing 102. Consequently, owing to the installation of an additional speaker phone inside the hinge housing 129, most of one surface of the second housing 102 may be dedicated to the display 121, and stereo sound may be realized as well. Therefore, the inner space of the portable terminal 100 can be efficiently utilized.

As is apparent from the above description, the portable terminal of the present invention is configured such that a second housing may be unfolded sideways or upward from a first housing. Hence, when a user intends to use the portable terminal for a communication or multimedia function, the user can position a display to be elongated in a desired direction. Thus use convenience is increased. Further, when a display is installed in the second housing having a hinge housing, space utilization can be increased by installing a speaker or other device inside the hinge housing. Accordingly, a display requiring a substantially large part of the limited size of the portable terminal can be installed. Thus the present invention can contribute to miniaturization of a portable terminal or expansion of a display in a small-size portable terminal.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A portable terminal having a pair of housings, comprising:
   a guide rib formed at an upper end of a first housing in which the guide rib is thinner than a thickness of the first housing to provide a reception groove;
   a first hinge member engaged with the first housing for rotating about a first hinge axis extended along a length direction of the first housing;
   a second hinge member having a hinge housing formed in a second housing, the hinge housing extending along a width direction of the second housing; and
   an additional device accommodated in the hinge housing,
   wherein the hinge housing is positioned in the reception groove, covered by the guide rib as the second housing covers the first housing, and the hinge housing rotates about a second hinge axis extended along the width direction of the second housing with one end of the hinge housing engaged with the first hinge member, and
   wherein the second housing is opened to a side of the first housing via a rotation of the first hinge member about the first hinge axis, and the second housing is opened upward from the first housing via a rotation of the second hinge member about the second hinge axis;
   wherein the hinge housing is cylindrically-shaped and the additional device accommodated in the hinge housing comprises at least one of a speaker phone or a camera module.

2. The portable terminal of claim 1, wherein when the second housing is opened upward from the first housing, the guide rib serves as a stop for the second housing as an outer surface of the second housing interferes with the guide rib, thus limiting an opening angle of the second housing in a range of 155 to 165 degrees.

3. The portable terminal of claim 1, further comprising a keypad provided at the first housing and a display provided at the second housing, wherein when the first and second housings are folded to each other, the display faces the keypad.

4. The portable terminal of claim 1, wherein the hinge housing is formed at one end of the second housing and another speaker phone provided inside the other end of the second housing.

5. The portable terminal of claim 4, further comprising another camera module provided near the another speaker phone inside the other end of the second housing.

6. The portable terminal of claim 1, further comprising a fixing shaft extended along a direction of the first hinge axis, fixed in the first housing, and protruding at a side of the guide rib, wherein the first hinge member is engaged with the fixing shaft and rotates about the first hinge axis.

7. The portable terminal of claim 6, wherein the first hinge member includes a first rotation member engaged with the fixed shaft for rotating about the first hinge axis, and a cover member for covering the rotation member.

8. The portable terminal of claim 7, wherein the second hinge member includes a rotation shaft extended along the direction of the second hinge axis and engaged with the first rotation member for rotating about the second hinge axis, and a second rotation member fixed in the hinge housing, and
   wherein the second rotation member is extended along the direction of the second hinge axis and fixed to the rotation shaft for rotating along with the rotation shaft about the second hinge axis.

9. The portable terminal of claim 1, wherein the second hinge member is provided with an elastic member and a cam member therein.

10. The portable terminal of claim 1, wherein the first hinge member is provided with a fixing shaft being inserted therein and rotatably engaged with the first rotation member.

11. A portable terminal with a pair of housings, comprising:
    a guide rib formed at an upper end of a first housing in which the guide rib is thinner than a thickness of the first housing to provide a reception groove;
    a first hinge member engaged having the first housing for rotating upon a first hinge axis extended along a length direction of the first housing; and
    a second hinge member having a hinge housing formed in a second housing, the hinge housing is extended along a width direction of the second housing,
    wherein the hinge housing is positioned in the reception groove, covered by the guide rib as the second housing covers the first housing, and the hinge housing rotates about a second hinge axis extended along the width direction of the second housing, with one end of the hinge housing engaged with the first hinge member, and
    wherein the second housing is opened to a side of the first housing from a position in which the second housing is folded on the first housing via a rotation of the first hinge member about the first hinge axis, and the second housing is opened upward from the first housing from the position in which the second housing is folded on the first housing via a rotation of the second hinge member about the second hinge axis;
    wherein the hinge housing is cylindrically-shaped and at least one of a speaker phone or a camera module is accommodated in the hinge housing.

12. The portable terminal of claim 11, wherein when the second housing is opened upward from the first housing, the guide rib serves as a stop for the second housing as an outer surface of the second housing interferes with the guide rib, thus limiting an opening angle of the second housing.

13. The portable terminal of claim 11, further comprising a keypad provided at the first housing for being opened and closed by the second housing, and a display provided at the second housing,
 wherein when the first and second housings are folded to each other, the display faces the keypad.

14. The portable terminal of claim 11, wherein the hinge housing is formed at an end of the second housing and a speaker phone is installed within the hinge housing, further comprising another speaker phone provided inside the other end of the second housing.

15. The portable terminal of claim 14, further comprising a camera module provided near the other speaker phone inside the other end of the second housing.

16. The portable terminal of claim 11, wherein the second hinge member is provided with an elastic member and a cam member therein.

17. The portable terminal of claim 11, wherein the first hinge member is provided with a fixing shaft being inserted therein and rotatably engaged with the first rotation member.

* * * * *